Oct. 18, 1949.
G. E. KING
2,484,836
VARIABLE-VOLTAGE CONTROL SYSTEM OF
LIMIT-RESPONSIVE OPERATION
Filed July 5, 1947
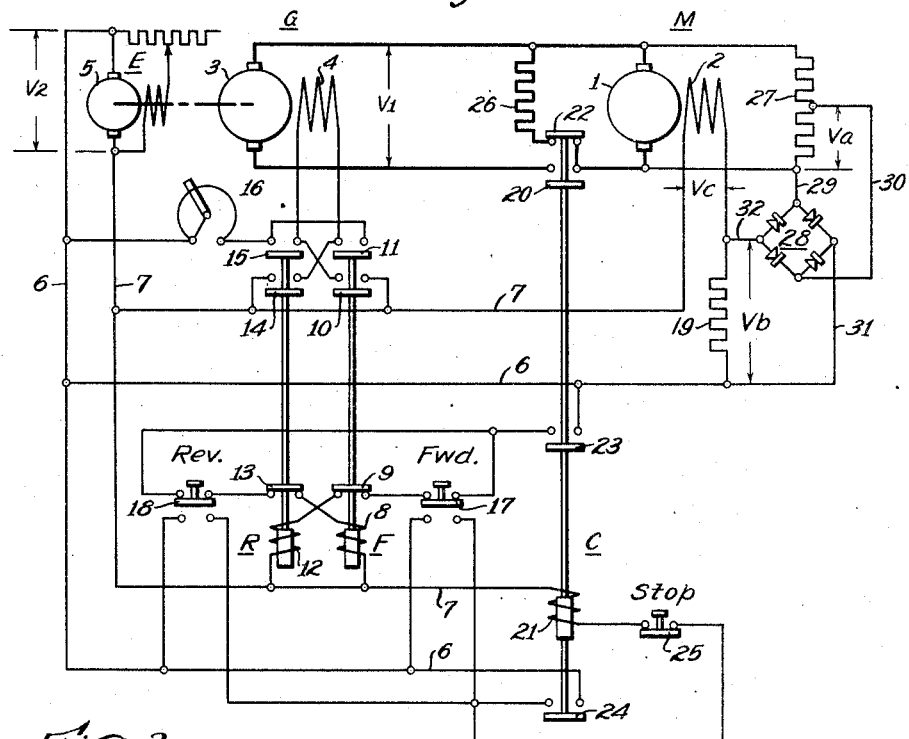
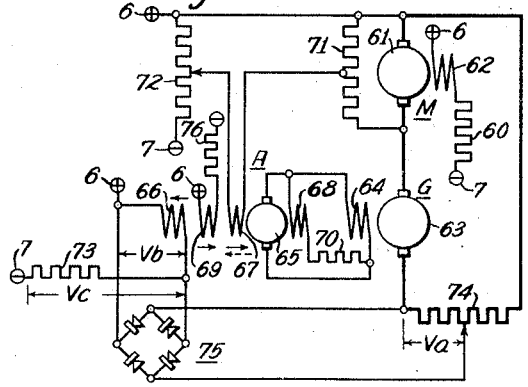
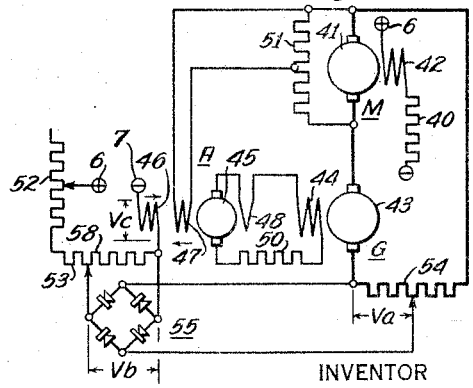
WITNESSES:
Robert A Baird
INVENTOR
George E. King.
BY
ATTORNEY Patented Oct. 18, 1949

2,484,836

UNITED STATES PATENT OFFICE 2,484,836

VARIABLE-VOLTAGE CONTROL SYSTEM OF LIMIT-RESPONSIVE OPERATION

George E. King, Pittsburgh, Pa., assignor to Westinghouse Electric Corporation, East Pittsburgh, Pa., a corporation of Pennsylvania Application July 5, 1947, Serial No. 759,271

10 Claims. (Cl. 318—145)

My invention relates to electric control systems in which a variable voltage or current produces control effects when its magnitude passes beyond a given limit. In more particular aspects, my invention concerns itself with systems of the Ward-Leonard type in which the field excitation of one or several of the appertaining dynamoelectric machines is controlled in dependence upon the occurrence of a given operating voltage or load condition of the system.

The most common way of providing a control in response to the occurrence of a given current or voltage condition involves the application of relays, such as voltage or load relays, which tend to produce a stepwise change in conditions when the limit condition is exceeded. In contrast thereto, it is an object of my invention to devise a limit-responsive electric control that performs its function without requiring movable devices, or relays in the customary sense, and is capable of a smooth, gradual and continuous performance which starts when the limit value is reached and from then on is substantially proportionate to the departure from the limit value.

Relative to Ward-Leonard type systems, it has also become known to provide an additional control generator of special design for the purpose of achieving a limit-responsive load control of gradual operation. Such a system is disclosed, for instance, in United States Patent No. 2,412,888 of J. G. Ivy, assigned to the assignee of this invention. In contrast thereto, it is also an object of my invention to provide a limit-responsive control for Ward-Leonard systems which requires neither an additional special generator nor any other machine or apparatus with movable or driven parts.

An object, subsidiary to those above-mentioned and related to variable voltage drives in which the speed of a motor is controlled by varying its armature voltage as well as by varying its separate field excitation, is to provide a field control of extremely simplified and more equalized operation as compared with the known drives of this particular kind. The known drive systems, as a rule, require a first field rheostat for the generator to control the variable energizing voltage for the motor, and a second rheostat in the field circuit of the motor for weakening the motor field to obtain maximum speed, and both rheostats must be mechanically or electrically interlocked to prevent operating the motor with low voltage on the armature at a weak motor field. It is also necessary to provide a relay which, when the drive is started with both rheostats set for maximum speed, prevents the weakening of the motor field until after the generator has developed a voltage of sufficiently high magnitude. This magnitude, for most applications, should be 50% to 60% of the rated generator voltage if a smooth continuous acceleration to maximum motor speed is desired. The lastmentioned object of my invention, therefore, is to eliminate the adjustable motor field rheostat and its interlock with the generator field rheostat, and to also eliminate the customary fieldweakening relay without sacrifice in safety of performance. Another object of the invention is to devise a variable-voltage motor control in which the full range of speed control, including the control due to field weakening, is obtained with the aid of a single rheostat, and in which the field weakening occurs automatically as the motor accelerates.

According to my invention, I connect a controlling or first circuit, energized by variable or adjustable direct-current or alternating-current voltage, with a second separately-excited directcurrent circuit by means of a coupling circuit which contains valve or rectifier means and is connected across an impedance member of the controlled circuit. The polarity of the valve means is such that they permit a flow of current only from the controlling circuit to the control circuit provided the voltage derived from the controlling circuit exceeds a magnitude determined by the voltage drop that occurs across the impedance member of the controlled circuit due to the separate excitation of the latter circuit. The just-mentioned current flow imposes a corresponding voltage drop on the impedance member, and this voltage drop is utilized for effecting the desired control of the second circuit.

According to another feature of my invention, and with particular reference to variable voltage systems of the Ward-Leonard type, I provide one of the dynamo-electric machines of the system with a field circuit which receives excitation of normally constant magnitude separate from the variable load voltage of the system, and I connect an impedance member of the field circuit by the above-mentioned valve or coupling circuit with the load circuit of the system so that the excitation of the field circuit is modified when the valve means impress a voltage drop across the impedance member.

According to a more specific feature of the invention, the last-mentioned field circuit contains a field winding and a resistor in series-relation to each other and either the winding or the resistor are connected to the output terminal of the valve means depending upon whether the excitation of the field winding is to be strengthened or weakened by the limit-responsive control.

The above-mentioned and other objects and features of my invention will be apparent from the following description of the embodiments exemplified by the drawing, in which:

Figure 1 is the circuit diagram of an electric drive system whose motor is speed-controlled by variable armature voltage as well as by variable field voltage; while Figs. 2 and 3 show the circuit diagram of two different drive systems whose motor is speed-controlled by variable voltage and protected from drawing excessive load currents.

The double-headed arrows shown in Fig. 1 as well as in the other figures and marked V1, V2, Va, Vb and Vc represent voltages and will be referred to hereinafter.

In Figure 1, the drive motor is denoted by M, the variable-voltage generator by G, and an appertaining exciter by E. The motor M is shown to have an armature 1 and a separately-excited field winding 2. The armature 1 is energized by voltage of variable or adjustable magnitude from the armature 3 of the generator, and this voltage is controlled by means of a separately excited generator field winding 4. The armature 5 of the exciter is preferably disposed on a common shaft with the armature 3 of the generator and driven at constant speed to provide a normally constant direct-current voltage between the exciter mains 6 and 7. It should be understood that the exciter is represented as a convenient source of constant direct-current voltage, but if desired may be replaced by another suitable source of such voltage.

The field windings 2 and 4 are excited from the mains 6 and 7. The excitation of the generator field winding 4 is reversible under control by a forward contactor F and a reverse contactor R in order to permit operating the motor in either running direction.

The coil 8 of contactor F controls three contacts 9, 10 and 11. The coil 12 of contactor R controls three contacts 13, 14 and 15. When either contactor coil is energized, the field winding 4 is connected across the exciter mains 6 and 7 in series with a speed-controlling field rheostat 16 whose adjustment controls the degree of field excitation and hence the magnitude of the voltage applied by the generator across the armature 1 of motor M.

Coils 8 and 12 are energized under control by a forward contact 17 and a reverse contact 18, respectively. Both contacts are preferably of the push-button type and biased toward the position illustrated in the drawing.

The motor field winding 2 is connected across the exciter mains 6 and 7 which apply a constant component field voltage. The circuit of field winding 2 includes a series resistor 19 which serves as a source of a second component field voltage in the manner described below.

The common armature circuit of the two dynamoelectric machines is controlled by the contact 20 of a control contactor C whose coil 21 operates also three additional contacts 22, 23 and 24. The circuit of coil 21 includes a normally closed stop contact 25. The contact 22 of contactor C controls a dynamic braking resistor 26. This resistor is connected across the motor armature 1 only when the contactor C is deenergized.

Connected across the motor armature 1 is a voltage dividing rheostat 27. A tapped-off portion of this rheostat is connected to the input terminals of a valve or rectifier unit 28 through leads 29 and 30. The output terminals of the valve or rectifier unit 28 are connected through leads 31 and 32 across the resistor 19 of the motor field circuit. Elements 28 through 32 thus represent a coupling circuit which connects the armature circuit (first circuit) with the separately-excited field circuit (second circuit). The valve elements of the coupling circuit consist preferably of dry or junction-type rectifiers although electronic tubes, such as diodes, are also applicable.

The polarity of connection of the valve unit 28 is such that it prevents the flow of current from the motor field circuit to the armature circuit. A current flow in the reverse direction, i. e., from the resistor 27 through the unit 28 to the resistor 19 of the motor field circuit can occur only if the voltage drop Va across the tapped portion of resistor 27—neglecting the voltage drop in the unit 28—exceeds the voltage drop Vb which arises across the resistor 19 due to the field current from the exciter mains 6 and 7. Hence, as long as the adjustable voltage V1 from the armature 3 of generator G remains below a given value, the armature circuit and the field circuit of motor M are virtually separated from each other so that the field excitation of the motor field winding 2 remains constant. However, when the generator voltage V1 exceeds the given value so that the voltage drop Va exceeds the voltage drop Vb, a current flows from the motor armature circuit across the resistor 19 with the result that the voltage drop Vb assumes the value determined by the voltage drop Va. Since the total voltage across resistor 19 and field winding 2 is equal to the constant voltage V2 impressed by the armature 5 of the exciter E across the mains 6 and 7, the increase in voltage drop across resistor 19 has the effect of reducing the voltage drop across the motor field winding 2. In other words, an increase of the generator voltage beyond the given value has the effect of weakening the motor field substantially in proportion to the excess magnitude.

The system as a whole operates in the following manner. If the forward button 17 is temporarily depressed, the coil 21 of contactor C is energized in the circuit 6—17—25—21—7. Contactor C picks up and closes the motor armature circuit at contact 20 while disconnecting the braking resistor 26 at contact 22. Contact 24 completes the self-sealing circuit 6—24—25—21—7 so that the contactor C remains picked up when thereafter the forward button 17 is released. The coil circuit of contactor C can be opened by actuating the stop contact 25 in order to stop the motor.

The contactor C, when picked up, completes for coil 8 of forward contactor F, the energizing circuit 6—23—18—13—8—7. Contactor F opens its interlock contact 9 and thereby prevents a subsequent energization of coil 12 in contactor R. Contacts 10 and 11 of contactor F connect the generator field winding 4 across the exciter mains 6 and 7 for excitation with the polarity necessary to run motor M in the forward direction. The field excitation of generator winding 4, and hence the generator voltage V1 impressed on the armature 1 of motor M, is determined by the selected adjustment of the speed control rheostat 16.

When the system is started in the just-mentioned manner, and assuming that the exciter and generator are driven at normal speed, the generator voltage V1 starts building up, and the motor accelerates accordingly. When the setting of rheostat 16 is such that the generator voltage V1 after reaching its adjusted value is below the magnitude necessary to pass current from resistor 27 through valve unit 28 to resistor 19, the motor field winding 2 is excited by constant voltage from the exciter mains 6 and 7. If the adjustment of rheostat 16 is such that the generator voltage V1 exceeds the above-mentioned magnitude, then the coupling circuit commences to pass current through resistor 19 as soon as that magnitude is exceeded, and this current increases together with the increase in generator voltage until the generator voltage reaches the adjusted value. As explained above, the current flow through the coupling circuit has the effect of decreasing the voltage across the motor field winding 2. The motor field is thus weakened and causes the motor to increase its speed.

If the motor is operated in the reverse running direction by depressing the reverse button 18, the operation is similar, except that now the contactor R is energized so that the voltage V1 impressed from the generator G upon the motor armature 1 reverses its polarity. However, since the valve unit in the coupling circuit is designed as a full-wave rectifier, the rectifier output voltage impressed across the resistor 19 retains the same polarity as before, and since the polarity of the motor field excitation from mains 6 and 7 is unchanged, the field weakening performance is the same as in the case of forward operation.

The performance of the system will be more fully understood from a numerical example. Let us assume that the rated generator voltage V1 is 230 volts, that the rated exciter voltage V2 is also 230 volts, and that the field winding 2 of motor M is rated for operation at a maximum voltage of 115 volts and has a resistance equal to that of the resistor 19. Under these conditions, the exciter voltage V2 divides itself equally between field winding 2 and resistor 19 so that, when the generator voltage V1 is zero, the voltage $V_c$ across field winding 2 is 115 volts, and the voltage drop $V_b$ across resistor 19 is also 115 volts. As long as during the starting period the voltage drop $V_a$ across the tapped-off portion of resistor 27 remains below 115 volts, the just-mentioned voltage conditions in the motor field circuit remain unchanged so that the motor 1 accelerates with a constant field and merely under control by the increasing voltage V1 of the generator.

Assuming now that the rheostat 16 is set for maximum speed and that the generator voltage V1 builds up to the rated value of 230 volts, the input voltage $V_a$ of the coupling circuit will increase to a value of, for instance, 210 volts. As a result, the coupling circuit imposes a voltage drop of 210 volts (neglecting any voltage loss in the valve unit) across the resistor 19 so that a voltage $V_c$ of only 20 volts remains impressed across the motor field winding 2. Consequently, the motor field is now weakened to the maximum extent, and the motor is set for operation at maximum speed.

It will be recognized that although the field weakening control remains ineffective during the starting interval and commences at a given value of the armature voltage, the field weakening performance, once started, occurs continuously and gradually from zero to maximum control. In this respect, a system according to the invention is superior to contactor systems because it avoids the sudden and stepwise changes inherent in relay controlled circuits. It will also be recognized that the speed control is fully automatic as far as the field weakening performance is concerned and eliminates the adjustable rheostat in the motor field circuit and the interlock devices heretofore necessary.

The above-described control system will be recognized as containing two individually excited circuits, both equipped with respective impedance members that developed a voltage drop substantially proportional to the voltages effective in the respective circuits. One of the two circuits contains a device to be controlled, which in the illustrated example is represented by the field winding 2 of motor M, and the two impedance members of the circuits are interconnected by a coupling circuit which has valve means input-connected to the impedance member of the first circuit and output-connected across the impedance member of the second circuit that contains the device to be controlled. In such an arrangement regardless of the particular design and purpose of the controlled device, an automatic and gradual control will be effected when the voltages in the respective circuits exceed a predetermined ratio regardless of whether one or the other voltage, or both, are variable. The voltage ratio at which the automatic control commences can be determined at will by the proper selection and rating of the impedance or resistance values. The suitability of such systems for control purposes other than the one explained above will be apparent from the examples described presently.

The control system illustrated in Fig. 2 serves to operate an electric motor in such a manner as to permit a continuous speed control while protecting the motor as well as the driven equipment from overloading. The illustrated system as to its general purpose and design is comparable to the known systems, exemplified by the above-mentioned patent to Ivy, but differs therefrom by a greatly simplified design of the control equipment needed for imposing the load limiting control on the main armature circuit of the system.

According to Fig. 2, the motor M has an armature 41 energized by variable voltage from a main generator G. The separately-excited field winding 42 of motor M is connected through a field resistor 40 to the positive and negative mains 6 and 7 of a constant voltage source which may consist of an exciter generator, if desired. The voltage generated by the armature 43 of the generator G is controlled by the appertaining field winding 44 which receives excitation from the armature 45 of a regulating generator A, preferably of the amplifying type. The generator A has three field windings denoted by 46, 47 and 48. The field winding 48 is series-connected with the armature 45 and the field winding 44 in order to provide self-excitation for the amplifying generator A. The resistance of the self-energizing field circuit is "tuned" by means of a calibrating resistor 50 so that the resistance line of this field circuit coincides approximately with the unsaturated and substantially linear portion of the magnetic no-load characteristic (air gap line) of generator A. As a result, the field excitation necessary to maintain the output voltage of armature 45 at any adjusted value is provided by the field winding 48, while the field windings 46 and 47 have merely the function to apply a control impulse for shifting the operating point of generator A upward or downward along the above-mentioned linear portion of its characteristic. This operation requires that the generator A operate substantially only within the linear portion of its characteristic.

The field winding 47 is connected across a portion of a voltage measuring resistor 51 which is connected across the terminals of the motor armature 41. The field winding 46 receives excitation from the above-mentioned constant voltage mains 6 and 7 through an adjustable rheostat 52 and in series with a resistor 53. The field windings 46 and 47 oppose each other as is indicated by the respective arrows shown close to the two windings.

Resistor 53 is coupled with a voltage dividing resistor 54 in the common armature circuit of motor M and generator G. This voltage dividing resistor 54 may, of course, consist of a series field winding, such as an interpole or compensating field winding of generator G or motor M, because its function is merely to develop a voltage drop $Va$ proportional to the load current which flows through the armature circuit. The coupling circuit between resistors 53 and 54 includes a valve or rectifier unit 55 of such polarity as to prevent a flow of current from the circuit of field winding 46 to the main armature circuit of the system, while permitting current flow in the reverse direction, provided the voltage drop $Va$ exceeds the voltage drop $Vb$ which occurs across the resistor 53 due to the constant field excitation from mains 6 and 7.

The resistor 52 serves to adjust the desired speed of motor M and may be associated with a master controller of the customary type.

It will be understood from the explanation given in the foregoing that, as long as the voltage drop $Va$ remains below a given limit, the excitation of the field winding 46 is constant and only determined by the selected setting of rheostat 52. When the system is started, the excitation of field winding 46 causes the amplifying generator A to apply a corresponding field excitation to the generator G so that the voltage of generator G builds up and accelerates the motor M. The voltage across the resistor 51 is approximately a measure of the motor speed. Consequently, as the motor approaches the desired speed value, the voltage impressed on the field winding 47 reaches a value at which the flux from winding 46 is just balanced. Under balanced conditions the resultant effect of windings 46 and 47 is zero so that then the excitation of generator field winding 44 is maintained at the value necessary to drive motor 1 at the proper speed. If the motor speed exceeds the proper value, the differential effect of field windings 46 and 47 has the same direction as the flux produced by winding 47, and this resultant flux reduces the output voltage of the amplifying generator and thus re-establishes the desired motor speed. Hence, the system is self-regulating and not affected by the circuit of the valve means 55 as long as the load current of motor M stays below a safe limit value. However, when the motor load current exceeds this value, the voltage drop $Va$ across resistor 54 exceeds the voltage drop $Vb$ sufficiently to pass current through the unit 55. As a result, the voltage drop across resistor 53 is increased, and the voltage $Vc$ across field winding 46 is reduced accordingly. The differential effect of windings 46 and 47 will then assume the flux direction determined by the excitation field winding 47 with the result of lowering the field excitation generator G and reducing the flux in the main armature circuit to the value at which the load current is again below the safe limit.

It should be understood that in Fig. 2, as well as in Fig. 3, I have shown only those elements of the system that are essential for understanding my invention or required to produce the function desired to be achieved. In practice, it will be necessary or desirable to provide the amplifying generator also with compensating or correcting field windings, for instance, to compensate for the I. R. drop in the main armature circuit. Such additional means are known as such and, for instance, apparent from the above-mentioned patent to Ivy, so that an illustration and description in the present specification appears unnecessary.

While in the foregoing embodiments of my invention the valve or coupling circuit is applied for reducing the voltage across the device to be controlled by that circuit, it is obvious that the invention can also be used for obtaining a controlled increase of voltage. This is exemplified by the embodiment of Fig. 3 which serves also to represent some other modifications applicable in systems of the kind described in the foregoing.

The control system according to Fig. 3 serves to control the speed of a motor M while safeguarding the motor circuit from the load currents beyond a desired limit value. In this respect the embodiment of Fig. 3 is similar to that of Fig. 2.

In Fig. 3, the armature of motor M is denoted by 61 and the appertaining field winding by 62. Winding 62 receives separate excitation through a resistor 60 from constant voltage mains 6 and 7. Armature 61 is energized by variable voltage from the armature 63 of a main generator whose field winding 64 is excited by variable voltage from the armature 65 of an amplifying generator A. Generator A has four field windings 66, 67, 68 and 69. Field winding 68 serves to provide "tuned" self-excitation for the generator A and, in this example, is shunt-connected to the armature 65 in series with a tuning resistor 70. Field winding 67 is connected to two voltage sources which operate in series opposition relative to the field winding. The first voltage source consists of the tapped-off portion of a voltage measuring resistor 71 connected across the motor armature 61. The other voltage source consists of the tapped-off portion of a voltage dividing rheostat 72 which is connected across the constant voltage terminals 6 and 7. Rheostat 72 is preferably associated with a master controller and serves to select the desired speed for motor M. When the motor M is at rest, the voltage across its terminals is substantially zero so that then the excitation of field winding 67 is determined only by the voltage across the tapped-off portion of rheostat 72. The flux produced by field winding 67 has then the direction to cause generator A to excite field winding 64 with the polarity necessary to generate in armature 63 accelerating voltage for motor M. As the motor M accelerates, the voltage drop across resistor 71 reaches a value at which it balances the adjusted voltage from rheostat 72. At that moment, the resultant field excitation of winding 67 is zero so that the self-exciting field winding 68 of amplifying generator A tends to maintain the main generator field excitation at the value then reached. If the motor runs too fast, the voltage from resistor 71 exceeds the adjusted voltage of rheostat 72 so that the differential effect of field winding 67 reverses its direction and causes the generators A and G to reduce the motor speed.

The field winding 66 is connected to the constant voltage terminals 6 and 7 in series with a resistor 73. Connected across the field winding 66 are the output terminals of a coupling circuit which includes a rectifier valve unit 75 whose input terminals are attached across a load measuring impedance or resistor 74 in the main armature circuit.

The field winding 69 is connected across the constant voltage mains 6 and 7 through an adjusting rheostat 76 and is excited with such a polarity that it opposes the field winding 66 with the result that, under normal operating conditions below the desired safe load limit, the resultant effect of field windings 66 and 69 is zero. Under such conditions, the speed-controlling performance of the system is only determined by the above-described function of the field winding 67.

When the load current in the common armature circuit of the dynamo-electric machines M and G exceeds the desired value for which the impedance members of the coupling circuit are rated, the voltage drop $Va$ across the input terminals of the coupling circuit exceeds the voltage drop $Vb$ across field winding 66 so a current flows from the main armature circuit across the field winding 66. As a result, the voltage drop $Vb$ across field winding 66 is increased while the voltage drop $Vc$ across resistor 73 is accordingly reduced. Due to the increased excitation impressed on winding 66, the differential effect of windings 66 and 69 assumes a finite value of such a direction as to superimpose a voltage reducing control on the generator A, thereby reducing the voltage of the main generator armature 63 and hence the speed and load current of motor M.

It will be noted that in the embodiment of Fig. 3, the impedance member of the controlled circuit, which is coupled by the valve circuit to the impedance member of the controlling circuit, is represented not by the series resistor 73 but by the impedance of the field winding 66.

It will be understood by those skilled in the art that my invention permits of various modifications, alterations and embodiments other than those specifically illustrated and described in this specification without departing from the above-disclosed objects, figures and principles of the invention and within the scope of the claims attached hereto.

I claim as my invention:

1. A variable voltage drive, comprising a variable-voltage generator, a variable-speed motor having an armature circuit connected to said generator to be energized thereby and having a separately energized field circuit including an impedance member, a coupling circuit extending across said member and being connected to said armature circuit to be impressed by variable voltage from said armature circuit, and valve means disposed in said coupling circuit with such a polarity as to impress a voltage drop across said impedance member only when said variable voltage exceeds a given limit magnitude in order to then weaken the excitation of said field circuit under control by said variable voltage.

2. An electric variable-speed drive, comprising a variable-speed motor having an armature and a field winding, a variable voltage circuit connected to said armature for energizing the latter, a voltage-dividing first resistor connected across said armature, a field circuit of normally constant voltage connected to said winding for providing excitation for said winding, a second resistor disposed in said field circuit, a coupling circuit containing valve means input-connected across at least part of said first resistor and output-connected across said second resistor with such a polarity as to impose a voltage drop on said second resistor in the direction required to weaken said excitation of said field winding when said valve means conduct current from said first resistor to said second resistor.

3. A variable voltage drive, comprising a generator having an armature and a field winding for control means connected to said field winding for providing it with adjustable excitation to cause said armature to generate variable and reversible voltage, a variable speed motor having an armature connected to said generator armature to be energized by said variable voltage and having a field winding, a field circuit for said motor field winding having current supply means for providing a normally constant component of field exciting voltage and including a field resistor, a voltage-measuring resistor connected to said motor armature for providing a control voltage substantially proportional to said variable voltage, and a full-wave rectifier input-connected across said voltage-measuring resistor and output-connected to said field resistor for imposing on said latter resistor a voltage drop for weakening the excitation of said motor field winding only when said control voltage exceeds a given limit magnitude.

4. A variable voltage drive, comprising a motor and a main generator having an armature circuit in common, said generator having a field winding, a regulating generator having an armature connected to said field winding to provide excitation for said winding, said regulating generator having field control means disposed for controlling said excitation and including a field winding member, a separately excited control circuit of substantially constant voltage connected to said control field winding and having a resistance member series-connected to said winding member, and a valve circuit having input terminals connected to said armature circuit and output terminals connected across one of said two members, said one member having a resistance dimensioned to provide a voltage drop larger than the input voltage of said valve circuit up to a given finite voltage of said armature circuit.

5. A variable voltage drive, comprising a motor and a main generator having an armature circuit in common, said armature circuit having an impedance means for developing a control voltage substantially proportional to the current flowing through said armature circuit, said generator having a field winding, a regulating generator having an armature connected to said field winding to provide excitation for said winding, said regulating generator having field control means disposed for controlling said excitation and including a field winding member, a separately excited control circuit connected to said control field winding and having a resistance member series-connected to said winding member, a valve circuit having input terminals connected across said impedance means and output terminals connected across one of said members, said one member having in said control circuit a voltage drop which is larger than said control voltage when said current is below a given limit value, whereby the excitation of said field winding member is controlled to limit said current when said valve is exceeded.

6. A variable-voltage drive, comprising two dynamo-electric machines having a common armature circuit, one of said machines having field control means which comprise a direct-current circuit of normally constant voltage having a field winding member and an impedance member series connected with each other, an impedance means connected with said armature circuit to provide a control voltage substantially proportional to a current magnitude of said armature circuit, valve means having input terminals connected across said impedance means and having output terminals connected across one of said members, said one member having in said direct-current circuit a voltage drop larger than said control voltage up to a given finite limit value of said magnitude, whereby said valve means conduct current from said armature circuit to said direct-current circuit only when said magnitude is exceeded.

7. A variable-voltage drive, comprising two dynamo-electric machines having a common armature circuit, one of said machines having field control means which comprise a direct-current circuit of normally constant voltage having a field winding member and a resistance member series connected with each other, a resistor connected with said armature circuit to provide a control voltage substantially proportional to a current magnitude of said armature circuit, valve means having input terminals connected across said resistor and having output terminals connected across said resistance member, said resistance member and said resistor being rated relative to each other so that the voltage drop caused by said direct current across said resistance member is larger than said control voltage up to a given finite value of said magnitude.

8. An electric drive system, comprising a variable-speed motor having an armature, a variable-voltage circuit connected to said armature, said motor having a separately excited field winding, a field circuit of normally constant voltage which includes said winding and has a resistor series connected with said winding, a coupling circuit extending across said resistor and being connected to said armature circuit, and valve means disposed in said coupling circuit and poled to permit said armature circuit to impress a field weakening voltage drop across said resistor only when said variable voltage exceeds a given limit magnitude.

9. An electric drive, comprising a drive motor having an armature and a field member, current supply means connected to said armature to provide energization for said armature, a first source of substantially constant voltage, a resistance member connected in series with said field member across said first source, a second source of variable control voltage of lower magnitude than said constant voltage connected across only one of said members, and a rectifier disposed between said second source and said one member and poled to permit current flow from said second source through said one member only when said control voltage exceeds a given minimum of a given polarity.

10. An electric drive, comprising a drive motor having an armature and a field member, current supply means connected to said armature to provide energization for said armature, a first source of substantially constant voltage, a resistance member connected in series with said field member across said first source, a second source of variable control voltage of lower magnitude than said constant voltage, said second source being connected with said current supply means to be controlled by said energization, and a rectifier disposed between said second source and said one member and poled to permit current flow from said second source through said one member only when said control voltage exceeds a given minimum of a given polarity.

GEORGE E. KING.

REFERENCES CITED

The following references are of record in the file of this patent:

UNITED STATES PATENTS

| Number | Name | Date |
|---|---|---|
| 2,301,689 | Edwards et al. | Nov. 10, 1942 |
| 2,329,538 | Huston | Sept. 14, 1943 |